United States Patent [19]

Martinez et al.

[11] Patent Number: 5,277,102
[45] Date of Patent: Jan. 11, 1994

[54] AUTOMATIC COFFEE DISPENSING MACHINE FOR PRODUCING COFFEE INFUSIONS

[75] Inventors: Antonio Martinez, Pamplona; Juan I. Ciaurriz, Orcoyen, both of Spain

[73] Assignee: Azkoyen Hosteleria, S.A., Aizoain, Spain

[21] Appl. No.: 882,185

[22] Filed: May 12, 1992

[30] Foreign Application Priority Data

May 13, 1991 [ES] Spain .................................. 9101161
May 7, 1992 [ES] Spain .................................. 9200950

[51] Int. Cl.$^5$ ........................ A47J 31/24; A47J 31/42; A47J 31/60
[52] U.S. Cl. ........................ 99/280; 99/286; 99/287; 99/289 R
[58] Field of Search ........... 99/279, 280-283; 286, 287; 289R, 295, 297, 300; 302R; 302P; 289P 426/433

[56] References Cited

U.S. PATENT DOCUMENTS

| | | | |
|---|---|---|---|
| 2,952,202 | 9/1960 | Renner et al. | 99/295 X |
| 3,103,873 | 9/1963 | Breitenstein | 99/289 R |
| 3,349,690 | 10/1967 | Heier | 99/283 |
| 3,760,712 | 9/1973 | Rossi | 99/289 R |
| 4,188,863 | 2/1980 | Grossi | 99/286 |
| 4,230,033 | 10/1980 | Cuccia | 99/289 R |
| 4,271,752 | 6/1981 | Valente et al. | 99/289 R |
| 4,457,216 | 7/1984 | Dremmel | 99/289 R X |
| 4,796,521 | 1/1989 | Grossi | 99/289 R X |
| 4,797,296 | 1/1989 | Meier et al. | 99/289 R X |
| 4,885,986 | 12/1989 | Grossi | 99/302 P X |

FOREIGN PATENT DOCUMENTS

| | | | |
|---|---|---|---|
| 309780 | 4/1989 | European Pat. Off. | 99/280 |
| 2053466 | 7/1978 | Fed. Rep. of Germany | 99/289 R |
| 363411 | 4/1969 | Spain . | |
| 193578 | 7/1973 | Spain . | |
| 524359 | 7/1983 | Spain . | |
| 540714 | 2/1985 | Spain . | |
| 552455 | 2/1986 | Spain . | |
| 658583 | 11/1986 | Switzerland | 99/289 R |
| 8701570 | 3/1987 | World Int. Prop. O. | 99/286 |

Primary Examiner—Harvey C. Hornsby
Assistant Examiner—Charles Cooley
Attorney, Agent, or Firm—Helfgott & Karas

[57] ABSTRACT

An automatic vending machine for dispensing coffee infusions wherein a quantity of coffee is duly batched and compacted, and hot water is passed over the batched coffee thereby to obtain a coffee infusion which is discharged and collected in a suitable can, comprises a batcher and a mechanism for obtaining the infusion. The batcher includes a cylindrical body with a rotary vane in which two cavities are formed, which are alternately filled with batched coffee to be hauled upon rotation, to an ejector duct reaching a receptacle, the bottom of which is formed by a lower seat. The lower seat and the receptacle are mounted on a common shaft which can travel up and down and can rotate to allow the batched coffee to be carried from the ejector duct to face a compacting piston provided in a fixed body so that a batched coffee is compacted and hot water is passed therethrough. The shaft is driven by a cylinder piston.

11 Claims, 5 Drawing Sheets

AUTOMATIC COFFEE DISPENSING MACHINE FOR PRODUCING COFFEE INFUSIONS

FIELD OF THE INVENTION

The present invention relates to a vending machine for dispensing coffee infusions automatically activated using either coins or any other conventional activation system.

The vending machine of the present invention has a mechanism batching and feeding the ground coffee to the distribution unit, and a mechanism (automatic unit) for collecting the batched coffee, distributing the hot water onto the coffee and evacuating the mass or cake of used coffee to the waste tank.

The machine of the present invention as a whole is provided with protection means which, on the one hand, provide for the automatic cleaning from time to time of the main elements involved in preparing the coffee infusion and, on the other protection of certain machine elements or mechanisms.

BACKGROUND OF THE INVENTION

Several kinds of vending-machines and appliances dispensing coffee infusions are known, for instance disclosed in Spanish utility model 193,578 and Spanish patents 363,411, 524,359, 540,714 and 552,455, all of which relate to machines or parts thereof designed for the automatic vending of coffee infusions.

The machines of the above patent publications could carry out the following

1) Loading the ground coffee into the suitable receptacle provided.
2) Moving the part holding the receptacle containing the batched ground coffee to the operating position of the infusion.
3) Compacting the batched ground coffee, which takes place by means of two pistons travelling in opposite directions, toward one another, inside the receptacle where the batched coffee had previously been deposited.
4) Distributing or pouring hot water over the batch of compacted coffee, to obtain the coffee infusion.
5) Ejecting the mass or cake of used coffee.

The machines disclosed in the above publications all require that several actions be carried out in order for the above to take place, as well as ancillary means for rotation, in addition to the need to haul the ground coffee and the used mass or cake.

Besides these drawbacks, the mechanisms used to carry out these operations are complex and in most cases troublesome in operation.

SUMMARY OF THE INVENTION

The vending machine for dispensing coffee infusions, of the present invention has been constructed to fully overcome the above disadvantages in toto, putting forth a structurally simple and operatively efficient vending machine which essentially comprises:
a batcher mechanism designated to
eliminate the use of inclined hoppers for feeding the coffee,
to obviate the need for grinding until service is demanded,
to control the batch properly irrespective of a number of variables, such as condition of the coffee, extent of grinding and wear of the mullers, and
to permit adequate repetition without any maintenance being required;
a pumping unit, which is provided in any conventional coffee machine for distribution purposes, and is used as a drive element for the automatic unit.
a piston drives a shaft which triggers all the cyclic operations in moving up and down, wherein
feeding of the ground coffee to the unit and removal of the cake is by gravity, thereby preventing blockage as in other solutions, and
an activation system provides the batched coffee with a uniform compacting, irrespective of the quantity upon distribution, and a total drying of the cake of used coffee.

In the vending machine according to the invention, the ground coffee, coming from a conventional mill, is driven towards a tank through a side charging inlet thereof; the tank contains a rotatory vane which conforms two receptacles, each of which can take a position, upon rotation of the vane, so as to face the side charging inlet of the tank, such that when the respective cavity is filled with ground coffee, a piston located on an upper tank closure cover moves, triggering a microswitch which causes the mill from which ground coffee is supplied, to stop, and a conventional activation element, for instance a motor, eletromagnet, hydraulic cylinder and the like, activator then causes the said vane to turn 180° in order for the respective cavity filled with the batched ground coffee to positioned as an extension to the mouth of a vertical outlet, whereupon the batch drops due to gravity.

The batched ground coffee falls, as aforesaid, due to gravity through an ejector duct and drops directly upon a receptacle comprising a cylinder whose bottom is defined by a lower seat, the cylinder and the seat being independently coupled to a main rotating shaft which can move up and down, driven by a cylinder located at the lower end thereof.

The shaft is provided with a winding groove on its side, in which a first pin coupled to a fixed body can travel, and a second pin coupled to the body of the seat in the cylinder forming the receptacle for the batched coffee, such that, upon a vertical displacement of the main shaft, the ejector duct moves and the shaft turns as well as the bodies in which the receptacle for the batched coffee and the lower seat of the receptacle are conformed, the receptacle being moreover drawn towards a drive position against the lower seat by action of a helical spring.

In a given position, both the receptacle and the lower seat are located inside a body as a lower extension to an upper piston located in the body, such that upon upward travel of the vertical shaft and thus of such receptacle and the seat, the same shall drive against the piston which will in turn push against the batched coffee contained in the receptacle, compacting the same whilst hot water is inserted through the actual piston for distribution purposes, the infusion leaving through a side outlet into a duct from which the infusion is collected by means of a suitable cup.

Due to the simple and efficient design of the mechanism as a whole, according to the invention, not only are the above advantages afforded, but the batched ground coffee is not dragged along hot surfaces, as in the case in known systems, but it is transported on the same receptacle in which distribution takes place, the lower seat itself acting as the base of the receptacle.

Furthermore, the mass or cake of used coffee drops by gravity into a storage tank, once it is taken from the receptacle through the ejector duct, without first or later having to be dragged along hot surfaces.

It should be noted that the batched coffee is uniformly compacted, irrespective of the size thereof.

The machine includes a number of other improvements, among which noteworthy is a protection system which allows the main elements involved in preparing the coffee infusion to be cleaned from time to time, such cleaning to be effected either at the user's demand, from time to time, or after a given pre-set number of operations, such that in any case the machine itself actually proceeds with the cleaning operation, on being instructed to do so, coordinating the movements of the parts involved to take up the adequate position.

More specifically, the protection means with which the machine is equipped can be used to wash and clean the body receiving the batched ground coffee, including the upper and other parts thereof, for the hot water leaving the distributor at a given position shall flood the batched coffee receptacle, causing the same to overflow to clean the upper edge thereof. Part of the hot water shall leave through the relevant outlet duct, while the overflow shall drop to fill the lower base and be ducted through drains to tanks provided to such end.

In order for the hot waste water not to reach the shafts and mobile parts of the machine mechanisms, telescopic plastic material or metallic sheathes have been provided on the main shaft and a casing or washing deposit independent of the duct through which the cakes of used coffee are ducted has been provided, to avoid contact with the cleaning water.

As to the batcher device, in a further preferred embodiment, the batcher device comprises a tubular body with a horizontal sector at which the coffee arrives from the mill, to form a duct which leads into another vertical duct inside of which there is a flap drawn by a spring towards a closed position, while the other part of the flap is connected to an electromagnet or any other conventional system the activation of which causes the flap to move against the spring action causing it to open, the flap constituting the bottom for the batched coffee entering through the side duct. A photoelectric cell is provided in the vertical duct which causes the mill to stop when the relevant batched coffee cuts off its beam, whereupon coffee shall cease to enter for the relevant batch to be obtained.

DESCRIPTION OF THE DRAWINGS

In order to provide a fuller description and contribute to the complete understanding of the characteristics of this invention, a set of drawings is attached to the specification which, while purely illustrative and not fully comprehensive, shows the following.

DESCRIPTION OF PREFERRED EMBODIMENTS OF THE INVENTION

In light of the above figures, the automatic coffee infusion vending-machine of the invention includes a coffee batcher device and a device or mechanism to obtain the infusion.

Figure 1:
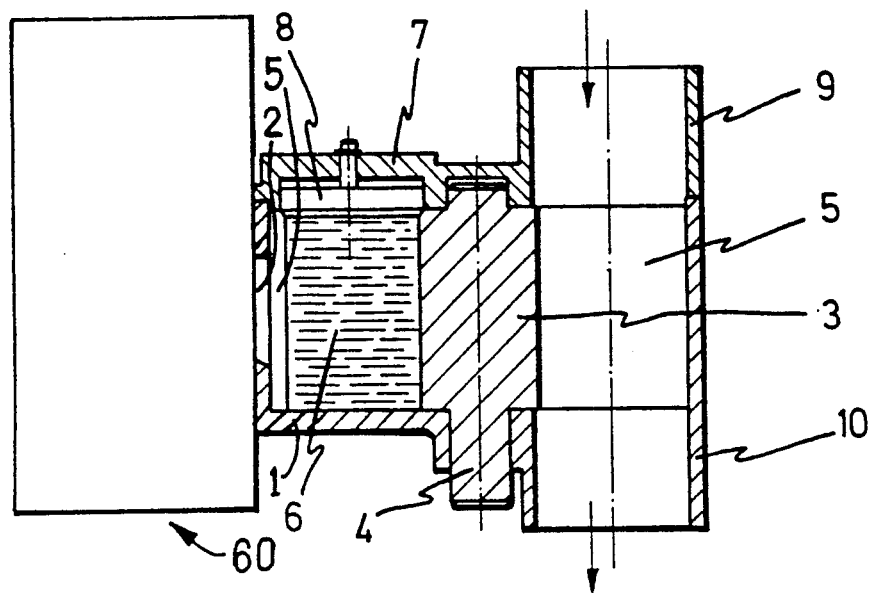
FIG. 1 is a diagrammatic side elevation and vertical section view of the ground coffee batcher applicable to automatic vending-machines dispensing coffee infusions, showing the batcher with a side window to which a mill shall be coupled such that the coffee from the mill can be inserted by impulsion through the side inlet up to the inside of the one of the cavities in the vane housed inside the general cylindrical body.
Figure 2:
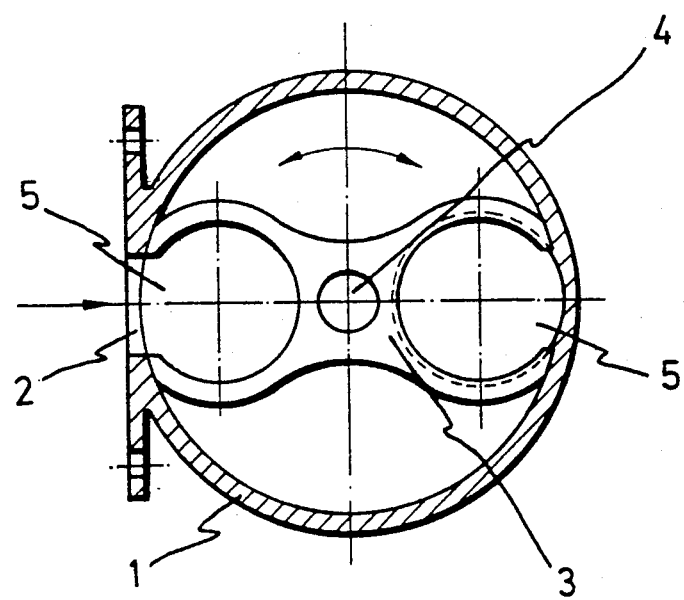
FIG. 2 is a diagrammatic upper plan and section view of the batcher of FIG. 1.
Figure 3:
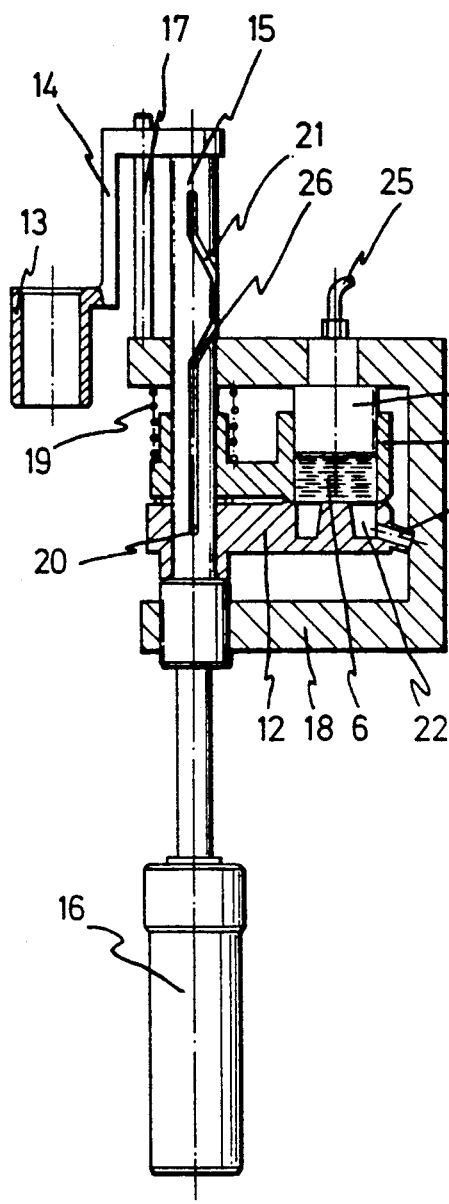
FIG. 3 is a diagrammatic side elevation and vertical section view of the actuation mechanism for obtaining the coffee infusion, in a position in which the batched coffee is being compacted.

As seen from FIGS. 1 and 2, the batcher device is actually comprised of a cylindrical body (1) located collaterally with the suitable conventional mill (which is not shown) such that the cylindrical body (1) includes a side window (2) on the wall of attachment to the conventional mill, while the interior thereof houses a vane (3) which can rotate by means of a central shaft (4), which vane forms two diametrically opposed cavities (5) such that, upon rotation of the vane (3), each of them can face the side window (2) to receive the relevant batched coffee (6).

The coffee batcher also is provided with an upper cover (7) under which a piston or plunger (8) is provided and used to activate a microswitch.

The cylindrical body (1) is also provided with a vertical load inlet (9) and a discharge or vertical outlet (10) which latter face each other vertically and in turn face one of cavities (5) in the vane (3) when the latter is obviously in the appropriate position.

Thus, ground coffee from a mill attached to the general body (1) of the batcher shall fill one of the vane cavities (5) through the side opening (2) such that once it is full the piston (8) shall be actuated and trigger a microswitch which shall cause the actual mill to stop working, in order for a conventional element, for instance a motor, eletromagnet, cylinder and so forth, then to cause the vane (3) to rotate about its central shaft (4) until the relevant cavity (5), full of ground coffee (6), faces the outlet (10) and the upper vertical hole (9), allowing the batched ground coffee (6) to drop due to gravity upon a receptacle (11) that forms part of the mechanism which prepares the coffee infusion and will be explained in detail below with reference to FIGS. 3-7.

The outlet duct (10) faces the inlet duct (9) through which a batched ground coffee of different characteristics can be manually inserted into the batcher.

The batched coffee (6) drops due to gravity towards the receptacle (11), which is a hollow cylindrical body whose bottom is formed as a mobile seat (12), through an ejector duct (13) which is connected through an arm (14) to a main drive shaft (15) which can travel up and down and can in turn rotate by action of a cylinder (16), the duct arm (14) being guided by means of a vertical shaft (17) coupled to a body (18) which remains fixed in respect to the main drive shaft (15).

The receptacle (11) forms part of a body mounted upon the main shaft (15) and drawn towards a downward drive position by a spring (19), the seat (12) making up the bottom of the receptacle (11) being mounted about the shaft (15) and related to the latter through a pin (20) which plays in a winding groove (21) provided on the side, on the shaft (15), the latter being guided through spaces provided to such end of the fixed body (18). A further pin (26) which is attached to the fixed body (18) also plays within the groove (21).

The seat (12) has spaces (22) communicating with the receptacle (11) for the infusion to exit, the spaces (22) leading into a duct (23) for the infusion to exit.

Furthermore, mounted upon the body (18) is a plunger or piston (24) which remains still, and which will be used to introduce the distribution hot water, through the duct (25), towards the batched coffee (6) in the receptacle (11).

Figure 4:
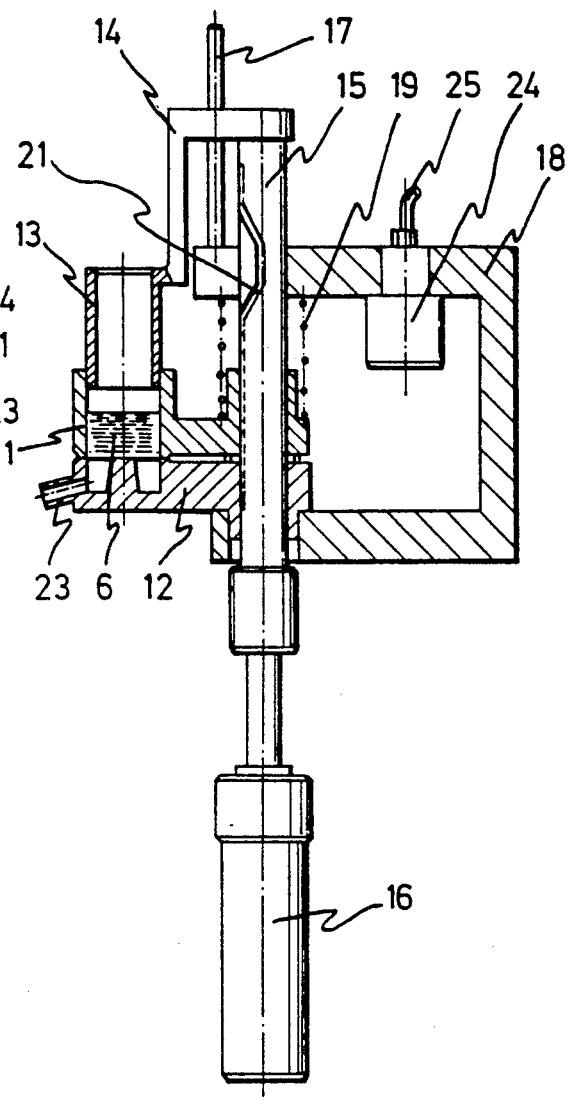
FIG. 4 is a another diagrammatic side elevation and vertical section view of the actuation mechanism, in a position in which it receives the batched coffee through the funnel-ejector through which the batched coffee drops due to gravity.

Thus, once the batched coffee (6) lies in the receptacle (11), as shown in FIG. 4, the shaft (15) is actuated, turns and travels up to face the fixed piston or plunger (24), in charge of compacting the batched coffee (6). Upon rotation of the main shaft (15) the receptacle (11) and the seat (12) making up the bottom also turn, due to the pin (20) coupled to the seat body (12), and which pin (20) runs along the winding groove (21) provided on the side surface of the shaft (15). At the same time, the upward travel of the main shaft (15) shall cause the arm (14) and hence the duct (13) to rise in order that seconds before the shaft (15) begins to turn the duct (13) and the receptacle (11) release each other in order for the latter's body to be able to turn as aforesaid.

The arm (14) is coupled to the shaft (15) which travels vertically next to the arm (14) and is guided by an auxiliary shaft (17) which is coupled to the body (18) to prevent rotation of the arm (14).

Once the receptacle (11) has come to face the piston (24) the rise of the main shaft (15) shall entail the rise or upward travel of the actual receptacle (11) and hence the compacting of the batched coffee (6), at the same time as hot water is distributed or poured through the inlet or duct (25), passing through the piston (24) and crossing the batched ground coffee (6), whereupon the infusion shall leave through the duct (23).

Figure 5:
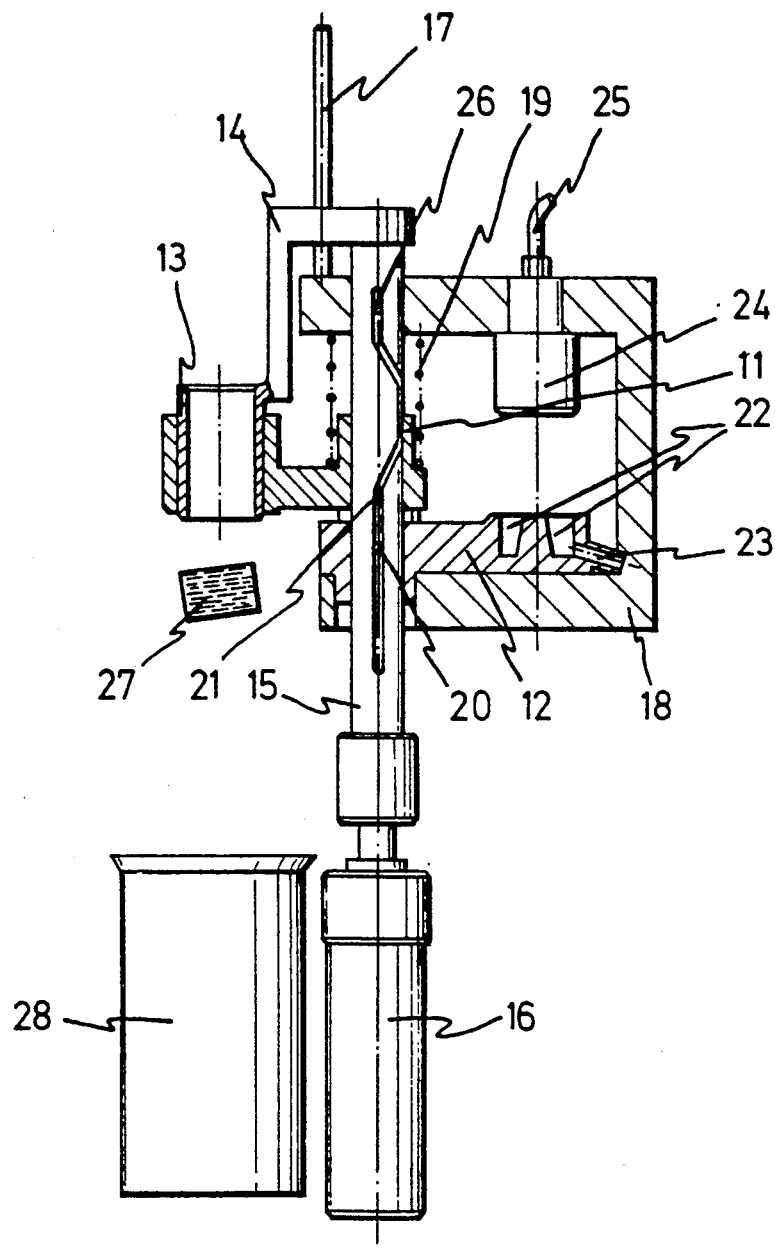
FIG. 5 is a section view of actuation mechanism in a position in which the mass or cake of used coffee is ejected, such ejection being caused by an actual duct-ejector.

Furthermore, once the batched coffee has been prepared, rotation in the opposite direction of the main shaft (15) shall entail the rotation of the receptacle (11) and of the lower seat (12) up to the position of ejection, whereupon, when the duct (13) faces the receptacle (11), the lower seat (12) shall turn towards its first position, as shown in FIG. 5, and then the shaft (15) shall move down, and the duct (13) shall be thus lowered and, on being inserted through the receptacle (11), shall eject the mass or cake of used coffee (27) as shown in FIG. 5, which shall drop into a general collector or case (28) for such used masses or cakes.

Figure 6:
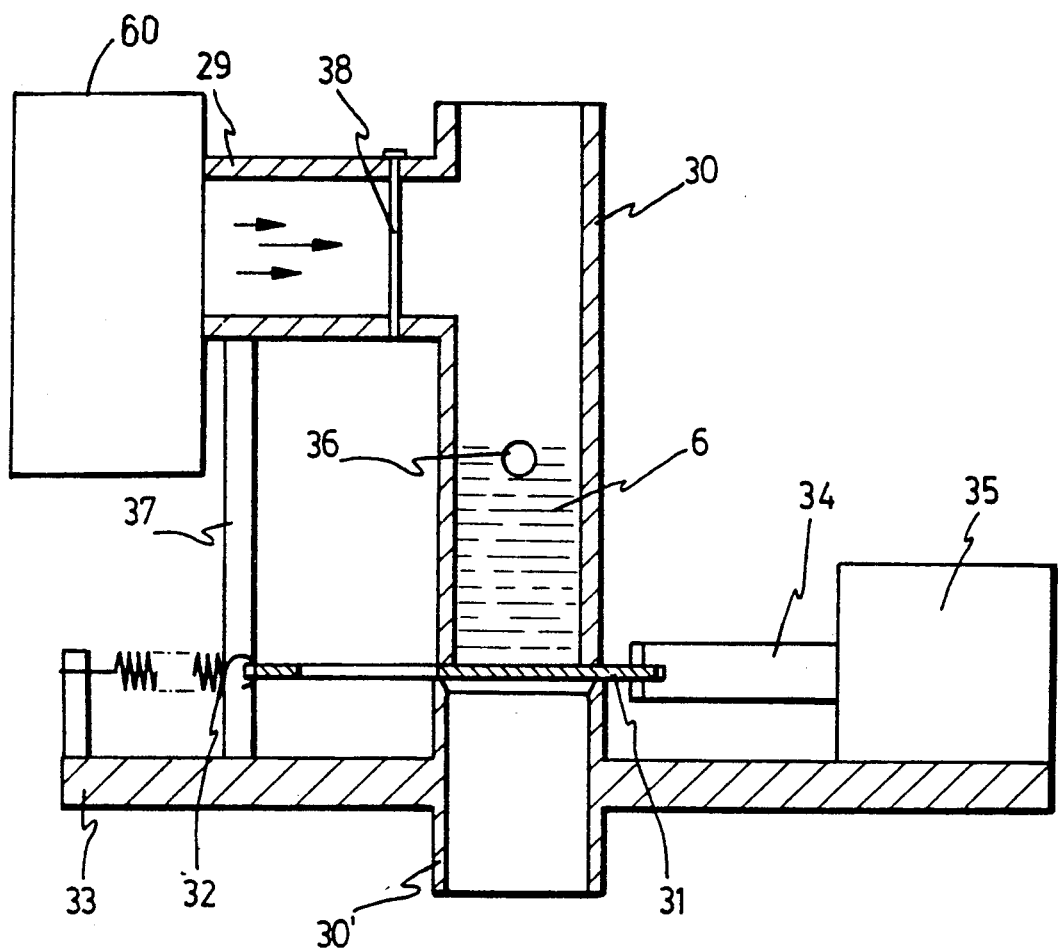
FIG. 6 is a vertical plane section view of the batcher device in accordance with a second embodiment, with a lower flap blocking the vertical duct of the device, such position defining the bottom for the coffee batch; said.

In a second embodiment, shown in FIG. 6, the batcher device comprises a tubular portion (29) disposed horizontally to face the suitable mill 60 such that the coffee provided by such mill enters through such lateral and horizontal duct (29), reaching a sector of the duct (30) in a vertical position, with a lower part (30') which defines a sector that can face the receptacle (11) in the coffee machine. Between the vertical duct (30) and the lower sector (30') thereof there is a flap (31) disposed horizontally, drawn at one of its ends towards a closed position by a spring (32), anchored at its other end to a fixed part or bearing (33) that makes up a branch of the tubular lower sector (30'). The other end of the flap (31) extends into and cooperates with the rod (34) of an electromagnet (35) or any other drive system that can drive such rod (34) as shall be explained hereinafter. Inside the duct (30) there are photoelectric cells (36), while the horizontal duct (29) and the lower bearing (33) are fixed to each other by means of columns (37), the horizontal duct (29) being moreover provided with a device (38) comprising a jet breaker of any suitable construction, provided to render exit of the coffee uniform.

In accordance with this structure, the coffee from the mill enters through the duct (29) and into the vertical duct (30), the batched coffee (6) being placed inside this duct (30), the bottom of which is defined by flap (31) which is drawn to the closed position by means of the spring (32) which drives it entirely, such that the mass of coffee which penetrates the duct (30), upon reaching up to a greater height, cuts off the beam let off by the photoelectric cells (36) and the latter send out the relevant instructions in order for the mill to stop, ceasing the supply of coffee, thereby to determine that the amount or mass of coffee penetrating the duct (30) is such that becomes batched appropriately. Next, and after receiving the relevant instructions, the electromagnet (35) or drive motor shall drive the flap (31) in the opposite direction, overcoming the spring (32) force and moving in order for the batched coffee (6) to drop through the lower sector (30') and be located in the receptacle (11), to which end the latter shall have turned and will have travelled up or down to an adequate position in which to receive the batched coffee (6).

The machine is fitted out with the protection system that shall be described hereinafter, and which allows the various internal elements and parts of the actual machine to be cleaned, safeguarding such mobile parts of the general mechanism from any dirt that can be generated in the process to obtain the coffee and allowing cleaning to take place automatically from time to time.

Figure 7:
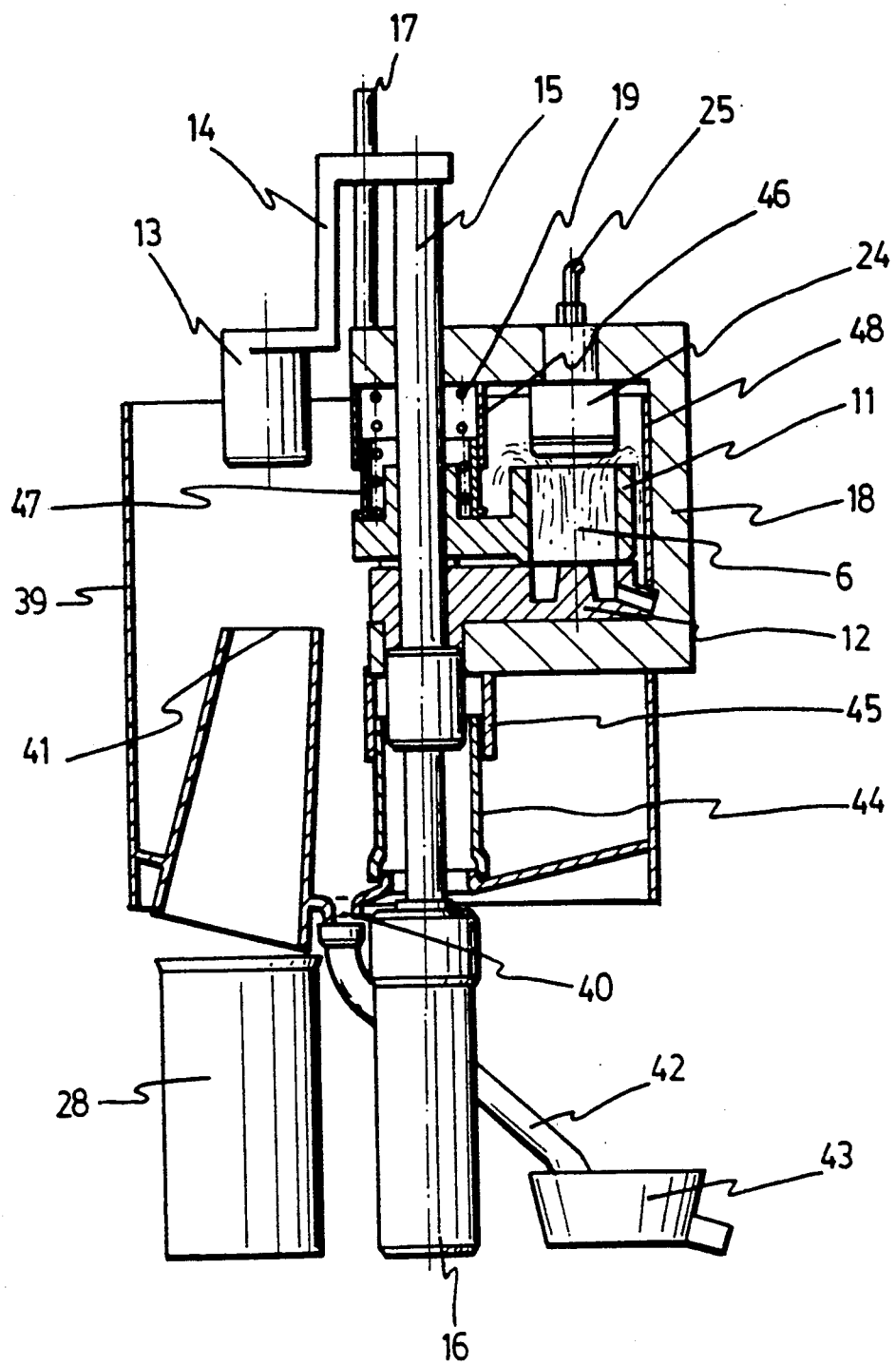
FIG. 7 a partially sectional view of the coffee infusion vending-machine fitted with protection system of the invention.

As shown in FIG. 7, the protection system as such comprises a cleaning tank (39) with a lower outlet (40), a duct (41) for conveying the used coffee towards the receptacle (28), such that the outlet (40) for the water leads into a duct (42) which in turn leads into a general drain (43). In addition to the tank 39, the protection system includes a casing (44) for the cylinder rod or piston (16) and a protection elements (45) extending over the casing (44) for the seat of the shaft (15) to be protected, in its upward and downward movement. The protections elements (44) and (45) must be telescopic to allow such upward and downward movement and moreover to protect the desired parts.

The protection system is in turn provided with a pair of telescopic bushings (46) and (47), the being first attached to the fixed bearing (18) and the latter being attached to the receptacle (11), moreover allowing such upward and downward travel and constantly protecting the spring (19) which tends to constantly push the receptacle (11) downwards, such that the bushings (46) and (47), together with the casing (44), define the means of protecting not only the spring (19) and parts close to the same, but moreover altogether allow all of the elements that can be contaminated to be cleaned automatically, being able at all times to safeguard the area of actuation of the machine mechanism and ducting the waste and cleaning water and the used cakes of coffee along different ducts, preventing them from mixing. A casing (48) is coupled to the fixed body (18) for protecting the area of the shaft (15), spring (19) and receptacle (11).

The device has now been sufficiently described for any person skilled in the art to have grasped the full scope of the invention and the advantages it offers.

The materials, shape, size and layout of the elements may be altered provided that this entails no modification of the essential features of the invention.

The terms used to describe the invention herein should be taken to have a broad rather than a restrictive meaning.

We claim:

1. An automatic coffee dispensing machine for dispensing coffee infusions, comprising a batcher, wherein a set quantity of coffee is conveyed towards an outlet facing said batcher from which a batched coffee is driven towards a compacting area in which hot water is provided to cross through the batched coffee to obtain a coffee infusion, the batcher comprising a cylindrical body having an inlet duct, an outlet duct and a side opening facing a coffee mill, the cylindrical body having an interior fitted with a rotatable vane including two diametrically opposed cavities so that, upon rotation of the vane, one of said cavities faces said side opening in the cylindrical body to receive the batched coffee from the mill, the batched coffee being driven from said one of said cavities towards said outlet duct which, upon further rotation of said vane, faces said one of said cavities, said outlet duct also facing said inlet duct through which batched ground coffee of different characteristics can be manually inserted, a cover for closing said cylindrical body, said cover being fitted with a piston which travels upwardly when one of said cavities in said vane is filled with coffee and, upon travelling, activates a microswitch which stops operation of the mill and causes the vane to rotate; and an actuation mechanism including a cylindrical receptacle, an ejector duct, positioning means for positioning said ejector duct at said outlet duct so that said ejector duct receives the batched coffee driven by the vane so that the batched coffee drops due to gravity through said ejector duct into said cylindrical receptacle, said positioning means including a cylinder member and a common shaft operatively connected to said ejector duct, a movable lower seat forming a bottom of said receptacle and mounted with said receptacle on said common shaft independently from each other, said cylinder member being operated for moving said common shaft up and down and for rotating said common shaft, and a compacting piston for compacting said batched coffee received in said receptacle when said common shaft rotates and moves said receptacle and said lower seat upwardly to place the batched coffee under and in contact with said compacting piston.

2. The automatic coffee dispensing machine according to claim 1, wherein said common shaft has a winding groove receiving a first pin fixed to said lower seat; and further comprising a fixed body supporting said compacting piston, a second pin attached to said fixed body and playing within said groove, a guide shaft coupled to said fixed body at one end thereof, an arm guided on said guide shaft and connected to said common shaft to move up and down and rotate therewith, said arm being coupled to said ejector duct so as to place said ejector duct over said receptacle and insert said ejector duct into said receptacle and remove said ejector duct from said receptacle and rotate said ejector duct away from said receptacle upon movement and rotation of said common shaft and said arm therealong, and a hot water duct connected to said compacting piston to pass hot water through and be mixed with the compacted batched coffee located in said receptacle.

3. The automatic coffee dispensing machine according to claim 2, and further comprising a spring between said fixed body and said receptacle to urge said receptacle downwards against said lower seat.

4. The automatic coffee dispensing machine according to claim 3, and further comprising cleaning means including a cleaning tank including a hollow member for passing there-through cakes of used coffee from said ejector duct, a drain member for used water, said tank having an outlet in a base thereof, and an outlet duct projecting towards said drain member; and protection means including a first casing surrounding a piston of said cylinder member and including two tubular parts telescopically coupled to each other, one tubular part being fixed to a bottom of the cleaning tank and another tubular part being fixed to a lower part of said fixed body, and two telescopic bushings positioned between said fixed body and said receptacle, one of said bushings being coupled to the fixed body, and another of said bushings being coupled to the receptacle, and a second casing coupled to the fixed body for protecting an area of said common shaft, said spring and the receptacle.

5. The automatic coffee dispensing machine according to claim 2, wherein said ejector duct is constructed so as to eject a coffee mass produced after use of said batched coffee from said receptacle upon insertion of said ejector duct through said receptacle after said ejector duct has travelled downwards jointly with said common shaft.

6. An automatic dispensing machine for dispensing coffee infusions, comprising a batcher wherein a set quantity of coffee is conveyed towards an outlet facing said batcher from which a batched coffee is driven towards a compacting area in which hot water is provided to cross through the batched coffee to obtain a coffee infusion, the batcher comprising a substantially tubular body including a horizontal duct coupled to a coffee mill and a vertical duct in communication with said horizontal duct, a horizontal flap forming in said vertical duct a bottom for supporting a mass of coffee received to form a batched coffee, a drive spring to urge said flap to a closed position, a bearing forming a lower tubular section of said vertical duct below said flap and including a part to which one end of said drive spring is connected, means to horizontally move said flap between open and closed positions, and photoelectric cells positioned in said vertical duct and emitting beams which are cut off to stop the operation of the mill when a required quantity of coffee is received in said vertical duct; and an actuation mechanism including a cylindrical receptacle, an ejector duct, positioning means for positioning said ejector duct at said lower tubular section so that said ejector duct receives the batched coffee which due to gravity drops through said ejector duct into said cylindrical receptacle, said positioning means including a cylinder member and a common shaft operatively connected to said ejector duct, a movable lower seat forming a bottom of said receptacle and mounted with said receptacle on said common shaft independently from each other, said cylinder member being operated for moving said common shaft up an down and for rotating said common shaft, and a compacting piston for compacting said batched coffee received in said receptacle when said common shaft rotates and moves said receptacle and said lower seat upwardly to place the batched coffee under and in contact with said compacting piston.

7. An automatic coffee dispensing machine according to claim 6, wherein a coffee jet breaker is provided in said horizontal duct, and further including at least one vertical column extending between said horizontal duct and said bearing.

8. The automatic coffee dispensing machine according to claim 6, wherein said common shaft has a winding groove receiving a first pin fixed to said lower seat; and further comprising a fixed body supporting said compacting piston, a second pin attached to said fixed body and playing within said groove, a guide shaft coupled to said fixed body at one end thereof, an arm guided on said guide shaft and connected to said common shaft to move up and down and rotate therewith, said arm being coupled to said ejector duct so as to place said ejector duct over said receptacle and insert said ejector duct into said receptacle and remove said ejector duct from said receptacle and rotate said ejector duct away from said receptacle upon movement and rotation of said common shaft and said arm therealong, and a hot water duct connected to said compacting piston to pass hot water through and be mixed with the compacted batched coffee located in said receptacle.

9. The automatic coffee dispensing machine according to claim 8, and further comprising a spring between said fixed body and said receptacle to urge said receptacle downwards against said lower seat.

10. The automatic coffee dispensing machine according to claim 8, wherein said ejector duct is constructed so as to eject a coffee mass produced after use of said batched coffee from said receptacle upon insertion of said ejector duct through said receptacle after said ejector duct has travelled downwards jointly with said common shaft.

11. The automatic coffee dispensing machine according to claim 10, and further comprising cleaning means including a cleaning tank including a hollow member for passing there-through cakes of used coffee from said ejector duct, a drain member for used water, said tank having an outlet in a base thereof, an outlet duct projecting towards said drain member; and protection means including a first casing surrounding a piston of said cylinder member and including two tubular parts telescopically coupled to each other, one tubular part being fixed to a bottom of said cleaning tank and another tubular part being fixed to a lower part of said fixed body, and two telescopic bushings positioned between said fixed body and said receptacle, one of said bushings being coupled to said fixed body and another of said bushings being coupled to said receptacle, and a second casing coupled to said fixed body for protecting an area of said common shaft, said spring and the receptacle.

* * * * *